United States Patent Office 3,505,110
Patented Apr. 7, 1970

3,505,110
SUGAR PRODUCTS PREPARED FROM
HYDROXYPROPYLATED STARCH
Carl C. Kesler, Cedar Rapids, Iowa, Paul L. Carey, Winston-Salem, N.C., and Oliver G. Wilson, Blountsville, Ala., assignors to Penick & Ford, Limited, New York, N.Y., a corporation of Delaware
No Drawing. Filed Jan. 18, 1967, Ser. No. 610,041
Int. Cl. C08b 25/02; C13k 1/06; C13l 1/08
U.S. Cl. 127—29                                            9 Claims

ABSTRACT OF THE DISCLOSURE

Sugar products resistant to the action of salivary amylases and other animal amylases are prepared from hydroxypropylated starch by hydrolysis to a controlled dextrose equivalent (D.E.) and fermentables (F.E.). The products consisting of the hydrolyzate of the hydroxypropylated starch can be used either as a syrup or in dry form as an ingredient of confections and foods. The limited degradation of the product by salivary enzymes indicates that there will be substantially no digestion of the product in the mouth, and the product is generally resistant to amylases of animal origin. The product therefore has utility as a substitute for ordinary sugars where it is desired to limit digestion in the mouth, or in the digestive tract generally.

BACKGROUND OF THE INVENTION

Syrups and dry products for use in foods in lieu of sucrose are commonly prepared from corn starch, potato starch, or other vegetable starches by hydrolysis under controlled conditions. The techniques of hydrolysis include acid hydrolysis, or enzyme hydrolysis, or a combination of acid and enzyme hydrolysis. Such hydrolysis is ordinarily continued at least until the product has the character of a syrup, but depending on the use to be made of the syrup, it will contain varying proportions of glucose and polysaccharides. The syrup can be converted to a dry material by spray drying, or by crystallization where the hydrolysis is carried to a high glucose level. Two well known criteria of the extent of hydrolysis are the dextrose equivalent (D.E.) and fermentables (F.E.).

It is also common practice to etherify starch with various etherifying agents to form starch ether derivatives which have improved properties, principally as sizes or coatings for paper and textiles. As far as is known, no sugar-type syrups or other sugar-type products have been commercially manufactured from etherified starch. While it is known that etherified starch can be hydrolyzed, very little is known about the character of the resulting hydrolyzates. It has been suggested that ether linkages may survive the hydrolysis even when the hydrolysis is carried to the stage of forming monosaccharides. See Whistler and BeMiller, Industrial Gums, Academic Press, p. 730 (1959). A gas-chromatographic investigation of hydroxyethyl starch hydrolyzates has been reported. See Abstract No. 18, A.C.S. meeting, January 1966. As reported, hydroxyethyl starches of various molar substitution were hydrolyzed with sulphuric acid, deionized, lyophilized, and the trimethylsilyl (TMS) derivatives prepared, which derivatives were then subjected to gas-liquid chromatographic analysis. Japanese Patent No. 1,383,523 describes the preparation of photographic emulsions using dextrinized or mildly hydrolyzed etherified starch.

SUMMARY OF THE INVENTION

According to the present invention, sugar products having desirable properties are prepared from hydroxypropylated starches. The starch is etherified with propylene oxide to a predetermined level of hydroxypropyl substitution. The hydroxypropylated starch is then hydrolyzd to produce a syrup having a specified dextrose equivalent (D.E.) and fermentables (F.E.). If desired, the syrup can be converted to a dry product by spray drying.

The resulting product either as a syrup or in dry form can advantageously be used as a substitute for ordinary sugars. There has long been a need for relatively non-fermentable sugars for use in special foods. There is evidence that amylase-resistant saccharides may be of value in controlling dental caries, and such products can also be used to reduce calorie intake. Since the saccharide products of this invention are highly resistant to the action of digestive enzymes, including salivary amylases, pancreatic enzymes, and animal diastases, there will be substantially no enzymatic digestion of the saccharides in the mouth or in the gastrointestinal tract. Furthermore, since the products are non-toxic and highly palatable, they should be more readily acceptable as sugar substitutes than artificial sweetening agents. Some people object to the taste of artificial sweetening agents which is definitely unlike that of natural sugars.

DETAILED DESCRIPTION

The starch which may be corn starch, potato starch, or other vegetable or cereal starch, is preferably etherified in the granule form, the etherification being carried out with the granule starch in an aqueous suspension and the etherification conditions being controlled so that the starch is not gelatinized or swollen to a non-filterable state. This is a matter of convenience which facilitates the recovery and washing of the starch. One preferred etherification procedure is described in U.S. Patent No. 2,516,633, which discloses a general process of this type for reacting alkylene oxides with starch. However, other etherification procedures can be used, and it is not essential that the starch be in granule form either at the start or end of the etherification reaction. Other procedures for etherifying starch with alkylene oxides are described in U.S. Patents Nos. 2,516,632, 2,845,417, 2,516,634, and 3,135,739.

For the purposes of the present invention, the alkylene oxide to be used is propylene oxide. Propylene oxide can be reacted with starch by substantially the same procedures as other alkylene oxides such as ethylene oxide. Propylene oxide reacts monofunctionally with starch hydroxyl groups to introduce hydroxypropyl groups into the starch, the hydroxyl groups being attached to the second carbon of the propyl chain rather than to the terminal carbon as is the case with hydroxyethyl substituted starch. The propylene oxide that does not react with the starch converts to propylene glycol or other non-toxic by-product. Therefore traces of such by-products in the final product would not interfere with the use of the product in foods or confections. However, the trace by-products can be largely removed by suitable washing and purification.

In accordance with the present invention, the propylene oxide is reacted with the starch to a hydroxypropyl substitution of at least 5% by weight, and preferably to a hydroxypropyl substitution of 10% or more. Usually, the hydroxypropyl substitution should not exceed 40%. A particularly desirable level of hydroxypropyl substitution is from 10 to 20%. Since the reaction efficiency will vary, depending on the particular reaction conditions, as is well known in the art, it will usually be necessary to employ from a 5 to 40% excess of the propylene oxide to achieve the desired level of substitution, the amount of hydroxypropyl substitution being readily determinable by standard analytical procedures. See Analytical Chemistry, vol. 28, p. 892 (1956).

After etherification, the starch is preferably neutralized, and then hydrolyzed in water. The hydrolysis may be accomplished by the regular pressure and acid conversion process used to convert corn starch to corn syrup or the starch may be liquefied with a liquefying enzyme and then treated with a saccharifying enzyme to produce a syrup containing sugar ethers. A combination of acid-conversion followed by enzyme saccharification may also be used. Suitable starch liquefying enzymes are bacterial amylases, such as, Rohm and Haas' Rhozyme H-39, Miles Chemical's Tenase or HT-1000, and Wallerstein's WC-8. Saccharifying enzymes of different types may be used including fungal amylases from Aspergillus Oryzae, such as Rohm and Haas' Rhozyme K-2 and Miles Chemical's Dextrinase A; amyloglucosidases, such as, Miles Chemical's Diazyme L-30, or Rohm & Haas' Diastase 73, and Wallerstein's Amygase; and the saccharifying enzymes from malted grains. A suitable combination acid and enzyme conversion hydrolysis process is disclosed in Dale et al. Patent 2,201,609, and in Langlois Patent 2,891,869. A variation of the acid-enzyme hydrolysis procedure is disclosed in Shrenthal Patent 3,067,066.

While any of the standard hydrolysis procedures can be used, providing the hydrolysis is controlled, as will subsequently be described, it has been found preferable to employ an enzyme-enzyme hydrolysis procedure, first treating the starch with a liquefying enzyme (e.g., bacterial amylase), and then with a saccharifying enzyme (e.g., fungal amylase).

As previously indicated, the hydrolysis is continued until the starch is converted to the form of a syrup. The hydrolysis may conveniently be carried out at a solids concentration at about 25 to 40%. The resulting syrup can be concentrated to produce a final syrup containing from about 60 to 80% solids, such as 70 to 75% solids. Alternatively, the hydrolyzate can be spray or drum dried to produce a dry product.

In carrying out the hydrolysis it is important to control the dextrose equivalent and fermentables of the final product. Dextrose equivalent or D.E. can be determined by the Standard Analytical Method of the Corn Industry's Research Foundation, as published Aug. 25, 1952. The fermentables or F.E. can be determined by the Standard Analytical Method of the Corn Industry's Research Foundation, which was published as a tentative standard Jan. 25, 1957. (The Corn Industry's Research Foundation is now named Corn Refiners Association, Inc.)

In practicing the present invention, the hydrolyzate product preferably has a D.E. of 2 to 25% and an F.E. of 15 to 30%. In some embodiments, the dextrose equivalent may range from 1 to 30% and the fermentables from 5 to 35%.

Saccharide products produced in accordance with the present invention will consist essentially of the hydrolyzate of hydroxypropylated starch having the specified D.E. and F.E. values.

In terms of saccharide makeup, the product will be composed principally of glucose and hydroxypropylated polysaccharides. For example, the product may contain from 5 to 35% by weight glucose together with 65 to 95% hydroxypropylated polysaccharides. Preferably, the product contains little or no maltose. Usually, the maltose will not exceed 1%, and a maltose content of less than .5% is preferred. In certain embodiments, the maltose content is substantially nil as determined by standard analytical procedures.

The example is further illustrated by the following specific examples.

EXAMPLE I

Thirty four grams of NaOH were dissolved in 2040 g. of isopropyl alcohol and 1490 g. of corn starch (10.1% moisture) were added with stirring. To the slurry were added 210 g. of water and then 390 g. of propylene oxide.

The slurry was stirred at 123–125° F. for 91 hours. The alkali was then neutralized with glacial acetic acid to a point that an aqueous solution of the starch had a pH of 5.5. The starch was filtered and washed by reslurrying with 3000 ml. of alcohol. The filtered starch was air dried. Analysis of the starch indicated 13.91% hydroxypropyl substitution.

To a 20 gallon stainless steel vessel equipped with heater, agitator and thermometer were charged 42½ lbs. of water. Over a period of an hour 20¼ lbs. of starch (made by the above procedure) and 7 g. of Tenase liquefying enzyme were added alternately. The temperature was slowly increased during this period to raise the temperature to 140° F. The temperature was held at 140° F. for one hour and then increased to 187° F. The solution was cooled to 140° F. over a one hour period. Then 7 g. of Tenase were added and two of the heating and cooling cycles made followed by one hour at 180–186° F.

After cooling to 140° F. the pH was adjusted to 4.8 with HCl and 80 g. of Diazyme L-30 (amyloglucosidase) added. The solution was placed into a 140° F. oven for 86 hours.

The syrup was heated with live steam at 210° F. for ½ hour.

The syrup was filtered through a mixture of Sil-Flo and Celite 110. The syrup was passed through a 2" x 24" column packed with granular decolorizing carbon, filtered to remove the carbon fines and then passed through two series of 2" x 24" cationic and anionic columns.

The syrup was concentrated to 76% solids in a vacuum evaporator. The D.E. was approximately 24%, the fermentables (F.E.) 27%, and the product analyzed nil maltose. Digestion with salivary amylase for four hours at pH 6.8 and 37.5° C. did not increase the glucose, maltose, or D.E.

Example II

A pilot plant vessel was equipped with agitator, thermometer and heater. To the reactor were charged 39.4 gallons of corn starch slurry (153 lbs. dry starch). To the slurry were added 42½ lbs. of solution containing 2.33 lbs. NaOH and 9.1 lbs. of NaCl 7.8 lbs. of propylene oxide were added.

The slurry was heated at 110–118° F. for 64 hours. The pH was adjusted to 5.1 with sulfuric acid and 500 g. of additional acid were added. The slurry was heated at 126° F. until the starch was modified to a 5 g. alkali fluidity of 65 ml. This required 21 hours.

The starch was filtered and air dried.

To the stainless steel reactor of Example 1, which was modified to include a condenser, were added 83.5 lbs. of water and 30.5 lbs. of the above starch. The slurry was heated to 200° F. to gelatinize the starch.

After cooling to 133° F., 373 g. of 50% NaOH were added. Over a period of four hours, 10 lbs. of propylene oxide were added. The temperature was 110–130° F. during this period.

The reaction was continued at 85–130° F. for 37 hours. No residual propylene oxide was detected at this time.

The pH was adjusted to 7.0 with hydrochloric acid. The starch was heated to 186° F. and 140 g. of Tenase liquefying enzyme added. The temperature was held at 180–186° for 1½ hours and then increased to 194° F.

After cooling to 140° F. the pH was adjusted to 3.5 with HCl and 272 g. of Diazyme L-30 were added.

The solution was held at 140–142° F. for 91 hours. At this time, 272 g. more of Diazyme L-30 were added and heating at 140–142° F. continued for 48 hours longer. The syrup was heated to 204–214° F. for ½ hour and then treated with decolorizing carbon.

After filtering through diatomaceous earth, the syrup was passed through cationic and anionic exchange columns and finally concentrated in a vacuum evaporator to 70% solids. The fermentables (F.E.) were 20%, and the hydroxypropyl content 23.8%. The glucose was 6.0%, and the maltose nil. Digestion with salivary amylase for four hours at pH 6.8 and 37.5° C. did not increase the glucose, maltose, or D.E.

EXAMPLE III

To 800 ml. of water was added 2 ml. of conc. HCl and the pH adjusted to 6.7 with Ca(OH)$_2$. The water was heated to 185° F. and 1.2 gm. of Tenase was added.

Hydroxypropyl potato starch (13.5% substitution, 380 gm.) slurried in 700 ml. of methanol was added slowly with agitation to the water at 185–189° F. The addition required 2½ hours. Additional Tenase was added to promote thinning. The temperature was maintained at 185–189° F. for ¾ hour after the starch addition was complete.

The solution was cooled to 140° F. and the pH adjusted to 4.0 with HCl. Diazyme L-30 (6 gm.) was added and the solution placed into a 138–140° F. water bath for 85 hours.

The sample was treated with 10 gm. of Darco S-51 and 10 gm. of Sil-Flo and filtered. A second treatment did not improve the color which was hazy blue. The sample was treated with ion exchange resin and then concentrated to 55–60% solids syrup. D.E. of 18.7 and fermentables of 5.7% were obtained. The syrup was slightly hazy and has a bland taste.

The syrup gives a red color reaction with iodine which indicates the presence of dextrin-like materials.

Additional treatment with Diazyme L-30 did not appreciably affect the D.E., fermentables or color reaction with iodine.

Paper chromatography of the sample indicated considerable material above DP$_2$.

EXAMPLE IV

To 1700 ml. of water was added 300 g. of hydroxyethyl corn starch having a hydroxyethyl group content of around 2% and an alkali fluidity of 25 ml. The suspension was heated at 210° F. for ½ hour, cooled to 140° F. Ten grams of triethyl amine and 100 g. of propylene oxide were added and the suspension heated at 134–140° F. for 18 hours. Three grams of CaCl$_2$·2 H$_2$O and 2.4 g. of NaCl were added and the pH of the suspension was adjusted to 6.7 with HCl.

The suspension was heated to 185° F. and 3 g. of Tenase enzyme were added. After heating one hour at 185° F. the temperature was raised to 205° F. then lowered to 140° F. The pH was adjusted to 4.0 with HCl and 6 g. of Diazyme L-30 were added. The conversion was carried on for 144 hours after which the substrate still gave a red color with iodine.

The syrup was stirred with 10 g. of Darco S-51 and 10 g. of Sil-Flo, filtered, purified by ion exchange and concentrated to about 76% solids. The finished syrup had a D.E. of 7.2% and an F.E. of 16%.

EXAMPLE V

The hydrolyzates of hydroxypropylated starch prepared as described in Examples III and IV were investigated to determine whether they would be altered by amylases of animal origin. The samples and a control sample of unmodified corn syrup were incubated with three enzyme preparations, salivary amylase, pancreatin and animal diastase. The results are reported below in Table A.

TABLE A

| Substrate | Unmodified Corn Syrup | Syrup of Ex. III | Syrup of Ex. IV |
|---|---|---|---|
| ENZYME | | | |
| None: | | | |
| Glucose, percent | 18.3 | 12.6 | 8.4 |
| Maltose, percent | 22.6 | nil | nil |
| Salivary amylase: | | | |
| Glucose, percent | 15.4 | 11.7 | 9.4 |
| Maltose, percent | 41.5 | 4.3 | nil |
| Pancreatin: | | | |
| Glucose, percent | 15.1 | 15.4 | 6.1 |
| Maltose, percent | 33.8 | nil | nil |
| Animal diastase: | | | |
| Glucose, percent | 15.5 | 16.5 | 6.6 |
| Maltose, percent | 29.2 | nil | nil |

As shown by the above data, the conditions employed produced a marked alteration of the unmodified corn syrup control. The syrup produced by the procedure of Example IV was unaffected by any of the enzymes, while the sample produced by the procedure of Example III was only slightly affected by the salivary amylase, and not at all by the pancreatin and animal diastase. The data indicates that there would be minimal digestion of the syrup of Example III in the mouth, and no digestion of Example IV syrup in either the mouth or gastrointestinal tract would be expected.

Similar samples of the hydroxypropylated syrups were found to give substantially no pH change when subjected to salivary amylase, thereby indicating minimal cariogenic activity.

While in the foregoing specification this invention has been described in relation to preferred embodiments thereof and many details have been set forth for the purpose of illustration, it will be apparent to those skilled in the art that the invention is susceptible to other embodiments, and that certain of the details described herein can be varied considerably without departing from the basic principles of the invention.

We claim:

1. A sugar product consisting essentially of a hydrolyzate of hydroxypropylated starch, said hydroxypropylated starch having been prepared by etherifying starch with propylene oxide to a hydroxypropyl substitution of 5 to 40% by weight, said hydrolyzate having a dextrose equivalent (D.E.) of 1 to 30%, fermentables (F.E.) of 5 to 35%, and being capable of forming a fluid aqueous syrup at a solids concentration of at least 60%.

2. The produce of claim 1 wherein said product is in the form of an aqueous syrup containing from 60 to 80% solids.

3. The product of claim 1 wherein said hydrolyzate has a D.E. of 2 to 25% and an F.E. of 15 to 30%.

4. A sugar product consisting essentially of a hydrolyzate of hydroxypropylated starch, said hydroxypropylated starch having been prepared by etherifying starch with propylene oxide to a hydroxypropyl substitution of 10 to 20% by weight, said hydrolyzate having a dextrose equivalent (D.E.) of 2 to 25%, fermentables (F.E.) of 5 to 35%, and being capable of forming a fluid aqueous syrup at a solids concentration of at least 70%.

5. The product of claim 4 wherein said hydrolyzate has a D.E. of 2 to 25% and an F.E. of 15 to 30%.

6. The product of claim 4 in which said hydrolyzate has an F.E. of 15 to 30%.

7. A sugar product in the form of an aqueous syrup, the sugars in said syrup consisting essentially of a hydrolyzate of hydroxypropylated starch, said hydroxypropylated starch having been prepared by etherifying starch with propylene oxide to a hydroxypropyl substitution of 5 to 40% by weight, said hydrolyzate having a D.E. of 2 to 25%, an F.E. of 15 to 30%, and said syrup having a solids concentration of from 60 to 80%.

8. A sugar product in the form of an aqueous syrup, the sugars in said syrup consisting essentially of a hydrolyzate of hydroxypropylated starch, said hydroxypropylated starch having been prepared by etherifying starch with propylene oxide to a hydroxypropyl substitution of 5 to 40% by weight, said hydrolyzate having a D.E. of 1 to 30% and an F.E. of 5 to 35%, said solids consisting of 65 to 95% hydroxypropylated polysaccharides, 5 to 35% glucose, not over 1% maltose, and being present in said syrup at a solids concentration of from 60 to 80%.

9. The syrup product of claim 8 wherein said hydrolyzate has a D.E. of 2 to 25% and an F.E. of 15 to 30%, and said solids include not over 5% maltose and are present in said syrup at a solids concentration of about 70 to 75%.

References Cited

UNITED STATES PATENTS

| 2,833,759 | 5/1958 | Hobbs | 127—33 X |
| 2,965,520 | 12/1960 | Snyder | 127—29 X |
| 3,067,066 | 12/1962 | Ehrenthal | 127—36 X |
| 3,378,546 | 4/1968 | Tsuzuki | 260—233.3 |

OTHER REFERENCES

C. C. Kesler et al., "Methods in Carbohydrate Chem.," R. L. Whistler, ed., IV, 304–306, Academic Press, New York, 1964.

MORRIS O. WOLK, Primary Examiner

S. MARANTZ, Assistant Examiner

U.S. Cl. X.R.

99—141; 127—38, 42; 195—31; 260—233.3